United States Patent [19]
Cohen

[11] Patent Number: 5,796,948
[45] Date of Patent: Aug. 18, 1998

[54] OFFENSIVE MESSAGE INTERCEPTOR FOR COMPUTERS

[76] Inventor: Elliot D. Cohen, 2601 SE. Solana La., Port St. Lucie, Fla. 34952

[21] Appl. No.: 745,650

[22] Filed: Nov. 12, 1996

[51] Int. Cl.⁶ ............................................. G06F 13/00
[52] U.S. Cl. ......................... 395/200.36; 395/200.32; 395/200.55
[58] Field of Search .................. 395/700.03, 187.01, 395/752, 759, 200.32, 200.23, 200.34, 200.35, 200.36, 200.37, 200.47, 200.53, 200.54, 200.55; 370/912

[56] References Cited

U.S. PATENT DOCUMENTS

| | | | |
|---|---|---|---|
| 5,101,424 | 3/1992 | Clayton et al. | 379/10 |
| 5,369,440 | 11/1994 | Sussman | 348/462 |
| 5,394,540 | 2/1995 | Barnington et al. | 395/500 |
| 5,481,296 | 1/1996 | Cragun et al. | 348/13 |
| 5,503,561 | 4/1996 | Cohen | 434/236 |
| 5,550,575 | 8/1996 | West et al. | 348/5.5 |
| 5,606,668 | 2/1997 | Shwed | 395/187.01 |
| 5,619,648 | 4/1997 | Canale et al. | 395/200.36 |

Primary Examiner—Parshotam S. Lall
Assistant Examiner—Viet Vu
Attorney, Agent, or Firm—McHale & Slavin, P.A

[57] ABSTRACT

A network profanity interception that is installed on computer networks, such as a network mail system, for screening outgoing communication files for profane or offensive language according to a set of pre-defined criteria. Marking profane language for user identification, it places intercepted messages into users' inboxes along with explanation of undeliverable message status; flags return of intercepted messages; and provides for editing of profane language as identified so that intercepted messages can be re-sent.

12 Claims, 4 Drawing Sheets

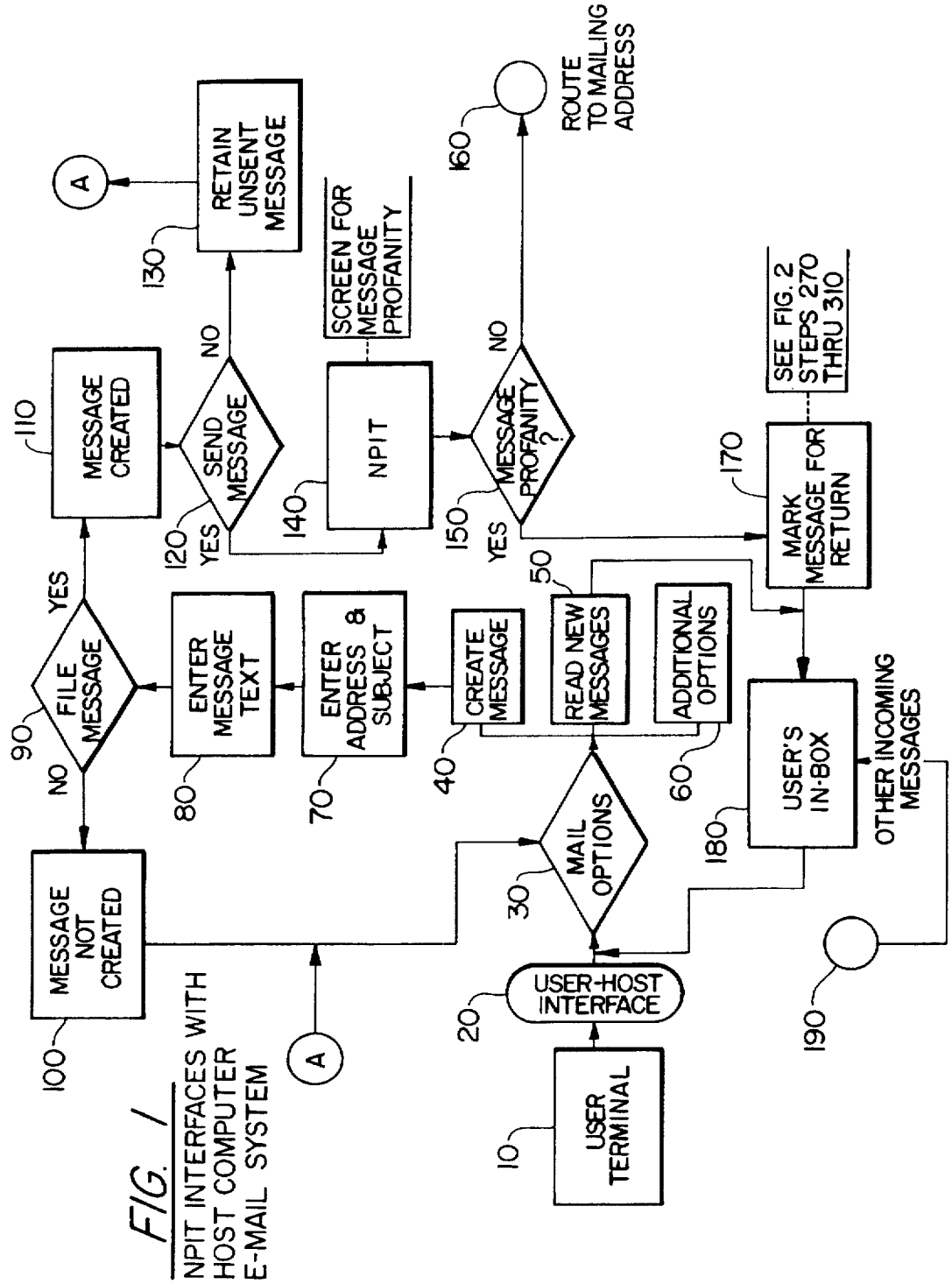

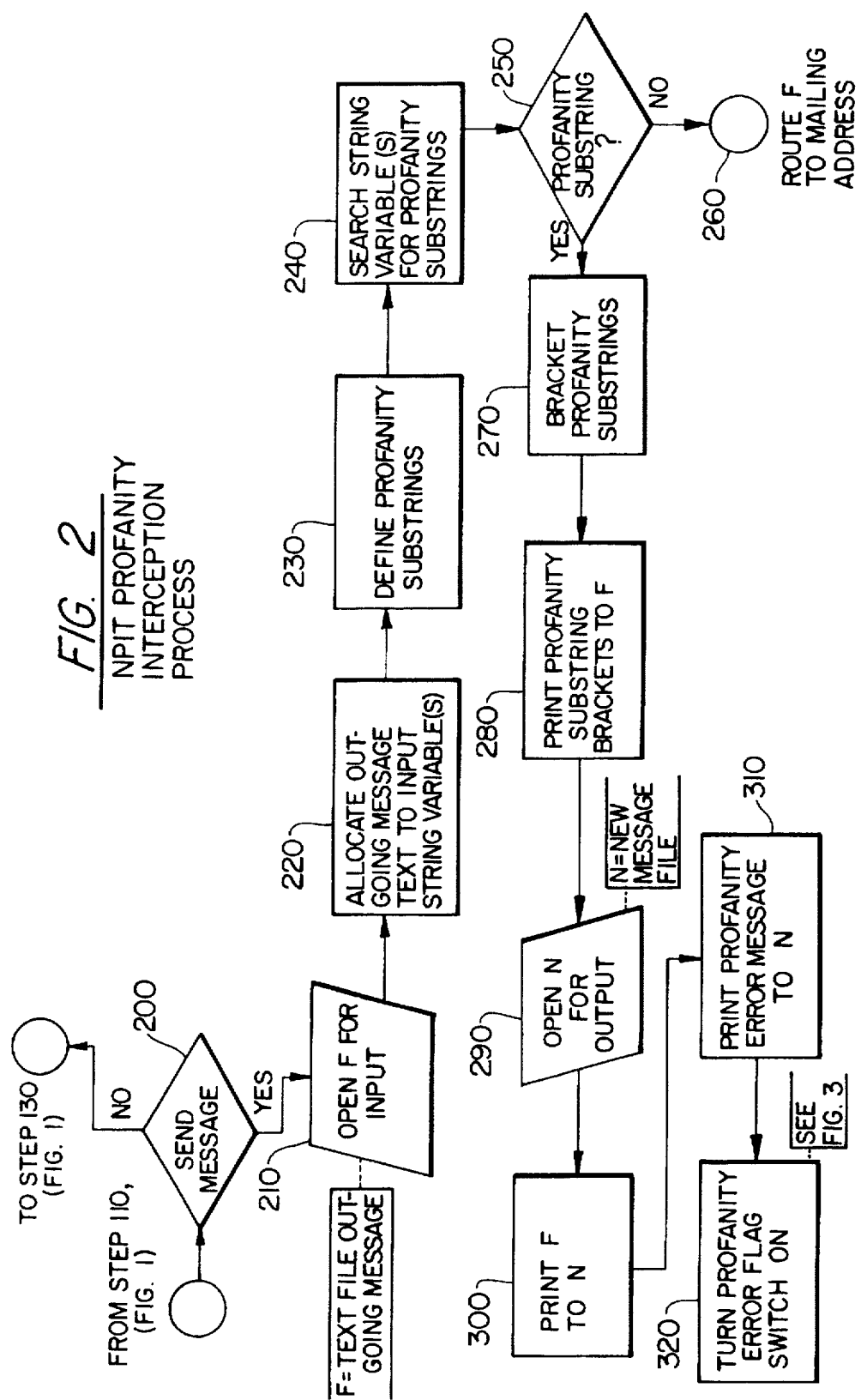

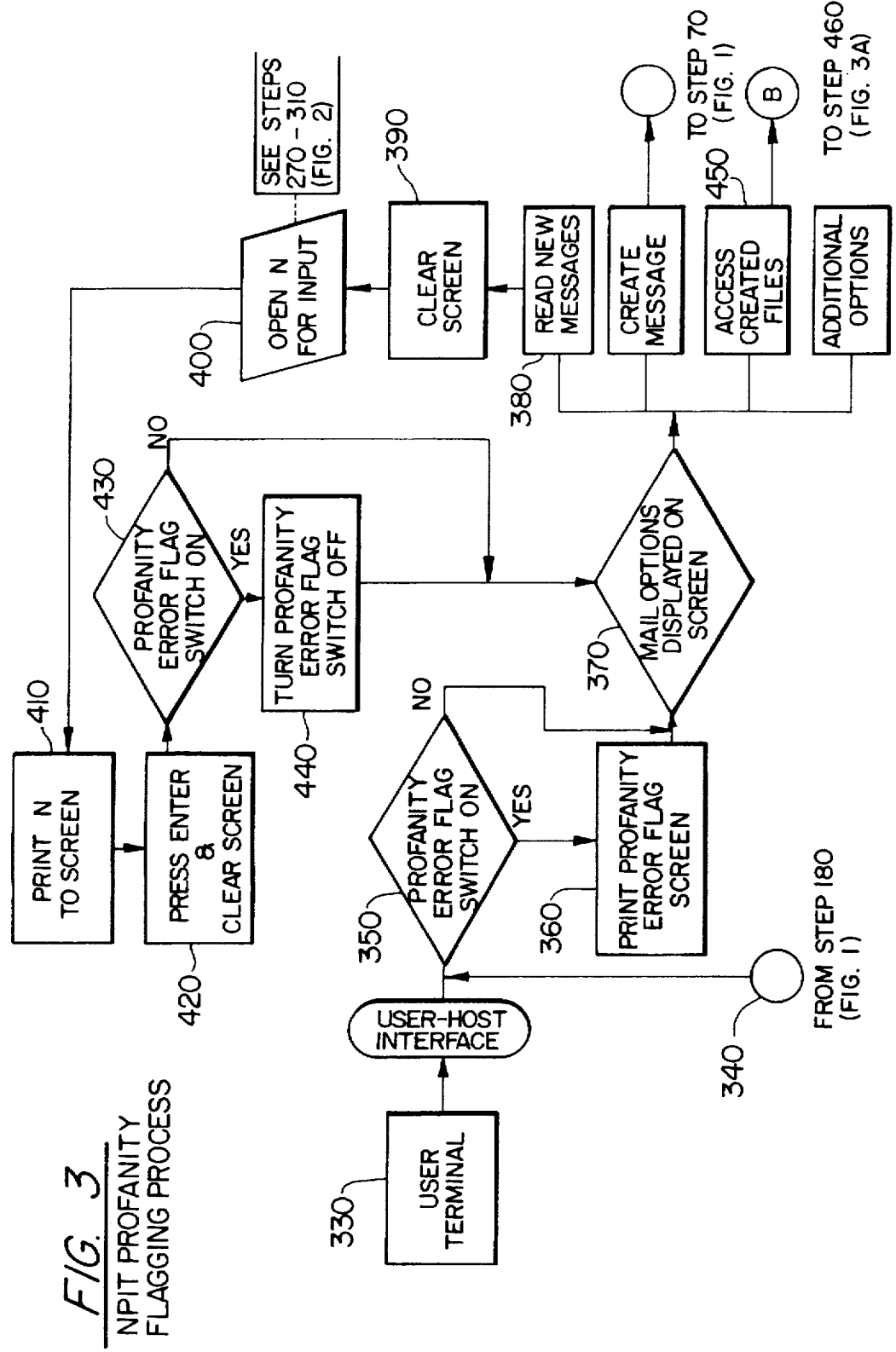

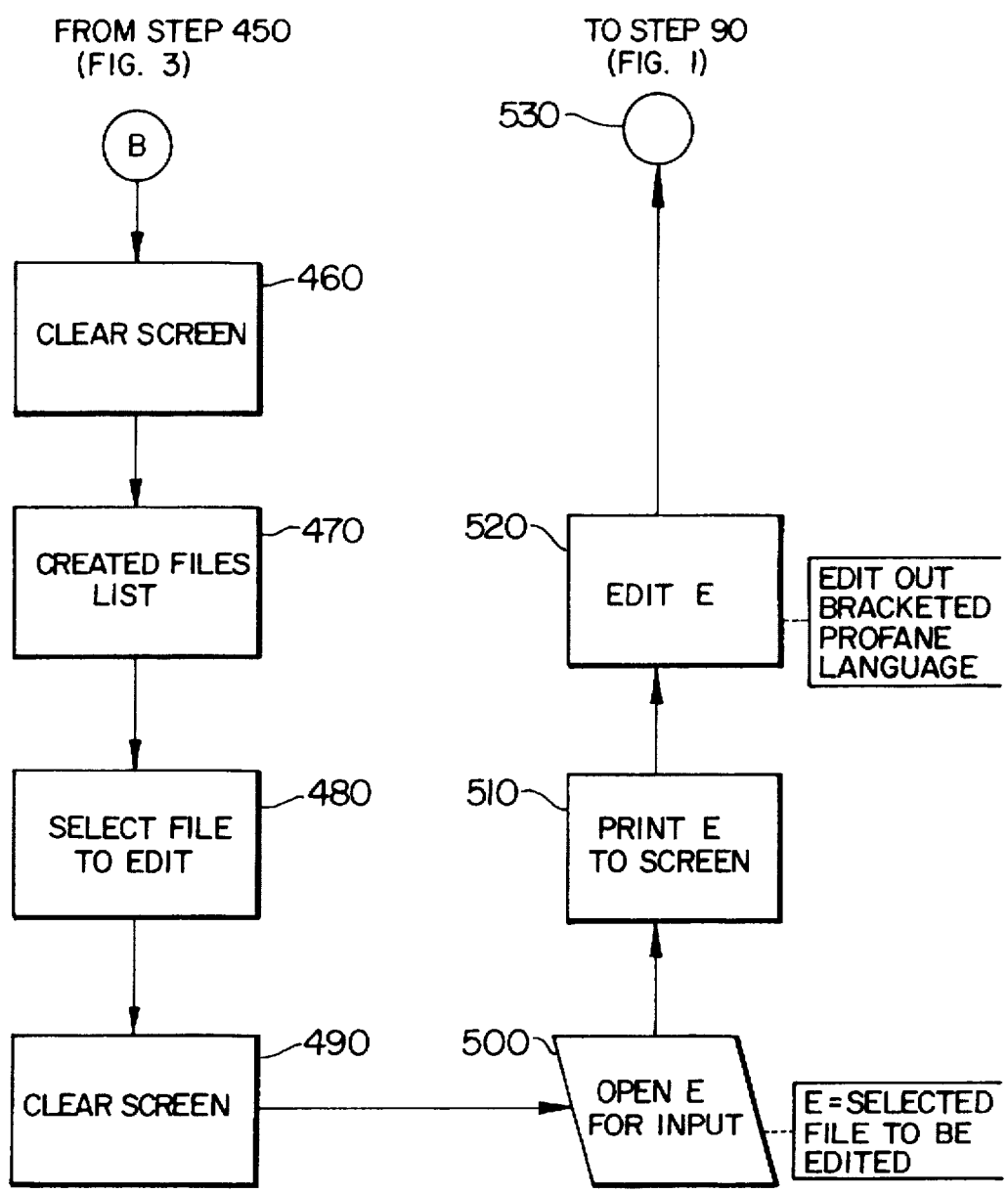

5,796,948

1

OFFENSIVE MESSAGE INTERCEPTOR FOR COMPUTERS

FIELD OF INVENTION

This invention relates to computer software and in particular to a software program that is incorporated into a computer system for intercepting offensive messages delivered through the computer system.

BACKGROUND OF THE PRESENT INVENTION

Private companies, state agencies, and schools providing electronic communication or mail services usually make clear in their user contracts that use of profane or offensive language is prohibited. However, enforcement of such "netiquette" is through human inspection of senders' messages upon complaint by a recipient of the offensive message. As a result, enforcement of these contracts is inconsistent and requires interference with senders' privacy inasmuch as senders have their private thoughts read by other persons. The 1996 Telecommunications Reform Act makes it a federal offense to annoy others by sending lewd or obscene messages across a computer network. Insofar as the aim of said legislation is preventing network users from sending such messages, a method thereof is needed that serves the law without inconsistent legal enforcement and without increasing the burden on an already overcrowded justice system.

Prior art in the field of network technology includes U.S. Pat. No. 5,023,911 which discloses a method for word recognition in a speech recognition system without predetermining endpoints. This program would compliment a software program in providing the endpoint definition which analyzes the length of a sentence so as to determine an endpoint through mathematical calculation. U.S. Pat. No. 5,101,424 discloses a program capable of monitoring text streams, in particular monitoring of telephone switches which are created by the AWK programs. This device is directed to field telephone installers who must do remote programming of the computer wherein speech recognition is possible for creation of code, particularly to a situation. U.S. Pat. No. 5,524,127 discloses a word detector which is programming as directed to software programs in a cordless telephone. U.S. Pat. No. 5,247,517 discloses a method and apparatus specific to analyzing token ring networks such as monitoring token ring delay, token rotation and bandwidth utilization in order to locate network problems, plan expansion and troubleshoot. U.S. Pat. No. 5,503,561 discloses a detection and diagnostic system for diagnosing and detecting reasoning errors known as fallacies in cognitive therapy, education, and employee training and management programs.

Thus, what is lacking in the art is a method for intercepting network profanity or offensive language without human intervention.

SUMMARY OF THE PRESENT INVENTION

Accordingly, it is an object of the present invention to provide a method for network intercepting electronic communications or mail containing profane or offensive words, word fragments, phrases, sentences, paragraphs, or any other unit of language as may be formulated in any natural language including but not limited to English, French, German, Spanish, Italian, Portuguese, Russian, Chinese, Japanese, Hebrew; and as may be formulated in any artificial language. Network profanity prevented and screened by said method includes but is not limited to vulgar language; hateful, threatening and defamatory speech; derogatory labels and terms of race, religion, gender, sexual orientation; and sexually degrading, obscene, lewd, or pornographic language.

It is a further object of the present invention to provide a method of profanity interception and return that is fully automated and therefore does not involve human intervention in screening for offensive messages. Advantages of such automation are several. First, senders' privacy is not violated. Second, providers' contracts are efficiently fulfilled without requiring use of message recipients turned informants. Third, profane or "x rated" communications considered unacceptable for audiences such as children are automatically intercepted and returned before reaching these audiences. Fourth, senders are not confronted with the possibility of sanctions such as cancellation of network privileges, imprisonment, payment of fines, and humiliation. Network customers who wish to use a network guarded by network profanity interception technology simply agree to accept the parameters for use of the network as they did prior to the advent and application of this technology; however, privacy rights are better protected and state and private contracts as well as federal law prohibiting network communication impropriety are efficiently satisfied.

It is a yet another object of the present invention to provide a method of computerized network profanity interception and return which installs onto diverse network kinds including, but not limited to, local area networks, wide area networks, and internetworks. Furthermore, whereas the present embodiment of the extant invention displays interfaces with a network's front end, host computer's mail software program therein serving to intercept outgoing messages containing profanity, the junctures at which network profanity interception technology may be positioned in a network system are various. For instance, further locations include remote, back-end computers or routing computers within the Internet.

Still another object of the present invention is to provide a method whereby network users whose outgoing messages are intercepted and returned for profane language are afforded explanation for a message's undeliverable status including a method for users' reliable profanity identification and editing, and subsequent re-sending of said message.

In meeting the aforementioned objectives, the present invention, in its present embodiment, installs onto a host computer in a network system, reads text from outgoing communication files, and screens for profane or offensive language according to a set of preprogrammed definitions. If no instance of said definitions is satisfied by said text, the file is sent. If at least one said definition is satisfied by said text, the program places brackets around each profane word or phrase that satisfies a definition, and places the file in the user's inbox. A general error message flag prompts the user to check said inbox regarding undeliverable mail. Upon opening new messages, the user receives explanation for a message's undeliverable status followed by the undeliverable message with each instance of profane language marked by brackets. Editing facility is provided and the user is allowed to "edit out" said bracketed language and to re-send said message.

Other objects and advantages of this invention will become apparent from the following descriptions taken in conjunction with the accompanying drawings wherein set forth, by way of illustration and example, certain embodiments of this invention. The drawings constitute a part of this specification and include exemplary embodiments of the instant invention and illustrate various objects and features thereof.

BRIEF DESCRIPTIONS OF THE DRAWINGS

FIG. 1 is a flowchart showing how the present embodiment of network profanity interception technology (NPIT) integrates with an electronic mail software system of a host computer.

FIG. 2 is a flowchart of the computerized process by which the present NPIT embodiment intercepts an outgoing electronic mail message.

FIG. 3 is a flowchart of the basic process by which NPIT flags returned messages containing profanity.

FIG. 3A is a flowchart of the process by which NPIT provides for editing and re-sending of returned messages containing profanity.

DETAILED DESCRIPTION OF THE PRESENT INVENTION

The detailed embodiments of the present invention which follow merely exemplify the invention which may be exemplified in many other forms. Therefore, all specified details of structure and function herein exemplified are not to be construed as delimiting the scope of the invention but merely as supportive of the claims herein made and as an example for instructing those skilled in the art to use the present invention in its various forms in a variety of detailed environments.

FIG. 1 illustrates one manner in which NPIT may be placed within a network in order to intercept and return electronic mail messages containing profane language. From the user terminal 10 the user connects to a host computer 20, for instance, by cable or modem. Once connection is made with said host's mail system, the user is prompted to select a mail option 30. The user can opt to create a message 40, read new messages 50, or choose among additional options 60 such as editing existing messages, checking for spelling errors, and exiting the mail system. To create a message, the user at step 70 indicates where the message is to be sent by entering an e-mail address and a subject name under which said message is to be stored. At step 80, the user then enters text from the user terminal 10, for example, by means of a keyboard or other input device. When the user has completed text entry, then, if the user intends to send the message 120, then the user must first file the message 90, that is, store the message in a retrievable data file by entering the appropriate system command from the user terminal 10. If the user does not file the message, no message is created 100 in which case the system returns the user back to the mail options 30. If the user selects to file the message then a message is created 110. At step 120, the user may still select not to send said created message 110 in which case the message file created 110 is retained for possible future use 130. If the user selects to send the created message 110 at said step 120, then the host mailing system interfaces with NPIT 140 and NPIT screens for message profanity before permitting at step 160 said created message 110 to be routed to the designated mailing address 70. At step 150, if no message profanity is discovered by the NPIT screening process 140, then the outgoing created message 110 is routed through network channels as the case may be to the designated mailing address 70. If message profanity is discovered by the NPIT screening process 140, then the outgoing created message 110 is intercepted at step 150. In case of interception at step 150, the previously outgoing created message 110 is marked 170 for return with an error message and profanity brackets (see FIG. 2, steps 270 through 310). At step 180 the message file 170 is deposited in the user's inbox along with any other incoming messages 190 the user might have received. The system then returns the user to mail options, which now also includes a profanity error flag alerting the user that a message the user has attempted to send has been returned (see FIG. 3, steps 320 and 330). At step 50, the user can opt to read new messages, which, in turn, will display the messages in user's inbox 180 including the created message 110 with the attached profanity error message 170.

FIG. 2 reveals basic architecture of the NPIT profanity interception process. When the user attempts to send a created message 200, the system opens a text file F containing the outgoing created message 210 (see also step 110, FIG. 1). The program then "imports" the text of said message 210 by allocating it to at least one input string variable 220. At step 230, the program then defines profanity substrings by assigning profane language text to specific instring functions. At step 240, the program then searches the string variable allocated at step 220 for said defined profanity substrings 230. At step 240, if not one of said substrings 230 is found in said string variable 220, then at step 250 outgoing message 210 file F is routed 260 to its designated mailing address (see step 70, FIG. 1). At step 240, if at least one of said defined substrings 230 is found in said string variable 220, then outgoing message 210 file F is intercepted at step 250 and is not permitted to be routed 260 to its mailing address. Instead, each profanity substring found 240 is enclosed in brackets 270 and said changes 270 are printed 280 to F. At step 290, a new message file N is opened for output. At step 300, message text 280 printed to F is now also printed to 290 new message file N. At step 310, a profanity error message is also printed to 290 new message file N. For example, said profanity error message 290 may state "Following message intercepted for profane language and currently undeliverable. Objectionable language enclosed in brackets." At step 320, a profanity error flag switch is turned on in order to control subsequent error messaging (see FIG. 3).

When messages are returned for profane language, the user must be informed. As shown in FIG. 3, when a user logs onto the network from the user terminal 330, or when the user is already on-line when a message is returned 340, the system checks to see if the profanity error flag switch 350 is turned on (see FIG. 2, step 320). If said switch 350 is off, then the system goes directly to mail options 370 without printing a profanity error flag 360 to the screen. If said switch 350 is on, then a profanity error flag 360 is printed to the screen. This flag 360 need only contain general information sufficient to alert the user that an attempt to send a message has failed, for example, "New message from host re: undeliverable mail." From the user terminal 330, the user can then select the read new messages 380 option to receive further information. If said option 380 is selected then the screen is cleared 390 and the file N containing the undeliverable message with profanity error message and brackets (see FIG. 2, steps 270 through 310) is opened for input 400 and printed to the screen 410. When the user has reviewed the on-screen information, the user then presses enter to clear screen 420. If the profanity error flag switch 430 is off, the system returns directly to mail options 370, but if said switch 430 is on, the switch is turned off 440 before returning to mail options 370.

The user may elect to edit the undeliverable message before attempting to re-send it, in which case, from the user terminal 330, the user will select the access created files 450 option. As FIG. 3A illustrates, when the user selects said access created files 450 option, the screen will be cleared 460, and a created files list 470 printed to the screen. At step 480, a file E containing the undeliverable message as previously named and filed (see steps 70, 80, and 90, FIG. 1) may be selected for editing from said list 470. The screen is then cleared 490, and the file E is opened 500 for input and printed to the screen 510. At step 520, the user edits said selected file 480, therein "editing out" profane language that is captured in brackets (see steps 270 and 280, FIG. 2). Said brackets thereby serve the user in locating and eliminating the profane language that had previously prevented the message from being sent. At step 530, the edited message may be filed (step 90, FIG. 1) and the user given the option to re-send said message (step 120, FIG. 1).

As will be apparent to those skilled in the art, various changes may be made to what has herein been specified without departing from the scope of the present invention. Therefore, the detailed description herein disclosed is to be understood as merely illustrative and the present invention is not to be understood as limited to the specific forms or arrangements of components shown in the drawings and described in the specifications.

What is claimed is:

1. An automated network offensive message interception method comprising the steps of:

(a) incorporating a network profanity interception technology "NPIT" software means onto an existing network computer system said NPIT software means having preprogrammed definitions and being operative to recognize forms of profanity included by any message creator, said profanity being network defined and within accepted parameters of said network use and selected from the group consisting of vulgar language, hateful, threatening and defamatory speech, derogatory labels and terms of race, religion, gender, sexual orientation and sexually degrading, obscene, lewd or pornographic messages in all natural and artificial languages;

(b) screening electronic messages transported through said network computer system for offensive messages for one of said forms of profanity;

(c) activating a flagging means for marking offensive messages screened by said NPIT software means; and (d) preventing the transmission of said offensive messages by returning said messages to the creator via a method that is fully automated and therefore does not involve human intervention.

2. The method according to claim 1 wherein said step of incorporating includes positioning said NIPT software means onto front-end or back-end or routing computers in combination with said network system.

3. The method according to claim 1 wherein said network system includes local area networks, wide area networks, and internetworks.

4. The method according to claim 1 wherein step (b) includes identifying said offensive language.

5. The method according to claim 4 wherein said identifying includes bracketing, highlighting, or listing.

6. The method according to claim 1 wherein said flagging means of step (c) includes a means for explaining undeliverable status of said offensive message.

7. The method according to claim 1 including a means for editing said offensive message.

8. The method according to claim 1 including a means for re-sending a message.

9. An automated network offensive message interception method comprising the steps of:

(a) incorporating a network profanity interception technology "NPIT" software means onto an existing network computer system said NPIT software means having preprogrammed definitions and being operative to recognize forms of profanity included by any message creator, said profanity being network defined and within accepted parameters of said network use and selected from the group consisting of vulgar language, hateful, threatening and defamatory speech, derogatory labels and terms of race, religion, gender, sexual orientation and sexually degrading, obscene, lewd or pornographic messages in all natural and artificial languages;

(b) screening electronic messages for one of the said forms of profanity transported through said network computer system for offensive messages;

(c) identifying screened offensive messages;

(d) activating a flagging means for marking screened offensive messages; and (e) preventing the transmission of said offensive messages by returning said messages to the creator via a method that is fully automated and therefore does not involve human intervention.

10. The method according to claim 9 wherein said step of incorporating includes installing said NIPT software means onto front-end or back-end or routing computers in combination with said network system.

11. The method according to claim 9 wherein said step (c) includes a step for bracketing, highlighting, or listing identified screened offensive messages.

12. The method according to claim 9 wherein said step (d) includes a step for explaining undeliverable status of a screened offensive message.

* * * * *